(No Model.)
L. SHULTS.
FISH HOOK.
No. 484,678. Patented Oct. 18, 1892.
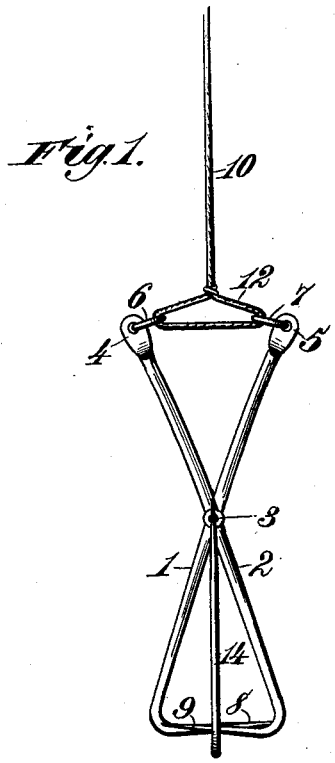
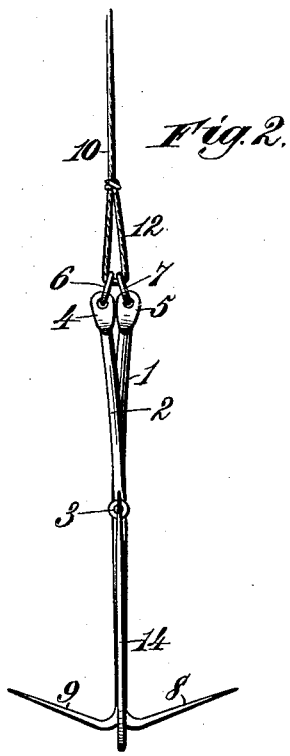
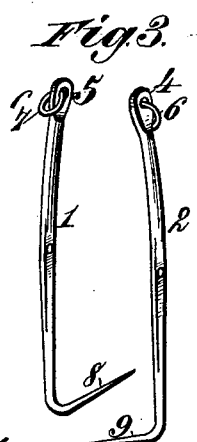
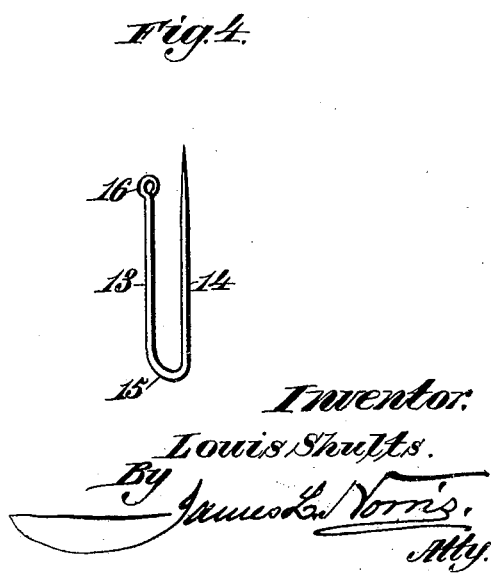
Witnesses.
Robert Erratt.
Dennis Sumby.
Inventor:
Louis Shults.
By James L. Norris.
Atty.

UNITED STATES PATENT OFFICE.

LOUIS SHULTS, OF BROWNVILLE, NEW YORK.

FISH-HOOK.

SPECIFICATION forming part of Letters Patent No. 484,678, dated October 18, 1892.

Application filed April 2, 1892. Serial No. 427,536. (No model.)

*To all whom it may concern:*

Be it known that I, LOUIS SHULTS, a citizen of the United States, residing at Brownville, in the county of Jefferson and State of New York, have invented new and useful Improvements in Fish-Hooks, of which the following is a specification.

This invention has for its object to provide a novel, simple, efficient, and economical barbless fish-hook of such construction that pressure on the line will cause barbless prongs to project in reverse directions through a yoke-shaped bait-holder into the fish, so that after the latter is landed it can be conveniently and expeditiously disengaged from the hook by merely operating the shanks of the prongs, thereby entirely avoiding handling the fish and the loss of time incident to removing barbed hooks.

To accomplish this object my invention involves the features of construction and the combination or arrangement of parts hereinafter described and claimed, reference being made to the accompanying drawings, in which—

Figure 1 is a side elevation of my improved fish-hook, the prongs being retracted and in position for fishing. Fig. 2 is a similar view showing the prongs projected as when operated to engage a fish. Fig. 3 is a detail perspective view of the crossing shanks, omitting the bait-holder and the fishing-line; and Fig. 4 is a detail perspective view of the bait-holder.

In order to enable those skilled in the art to make and use my invention, I will now describe the same in detail, referring to the drawings, wherein—

The numerals 1 and 2 indicate two rectilinear shanks crossing each other about centrally between their extremities and pivotally connected together at the point where they cross each other through the medium of a transverse pivot-pin 3. The shanks are provided at one end with eyes 4 and 5, in which rings 6 and 7 are pivoted or loosely hung, and at the opposite end portion the shanks are bent approximately at right angles and fashioned into sharpened barbless prongs 8 and 9, which in the normal position of the parts for fishing lie beside and parallel with each other.

The fishing-line 10 is formed at one end into a loop 12, which loosely passes through the pivoted rings 6 and 7 in such manner that pressure on the line will draw the loop through the rings, and thereby force the upper extremities of the shanks 1 and 2 in a direction toward each other, so that the barbless prongs 8 and 9 are projected to the position represented by Fig. 2.

The bait-holder is constructed of a yoke-shaped piece of wire and comprises two substantially-parallel arms 13 and 14, connected by the bent portion 15, and one of the arms having an eye 16, by which the bait-holder is suspended from the transverse pivot-pin 3 of the crossing shanks 1 and 2.

The bait-holder normally hangs perpendicular, and the barbless shanks 8 and 9 extend between the arms of the bait-holder and work back and forth in reverse directions in the space between such arms. The bait-holder is suspended wholly below the fishing-line and has no connection therewith, so that the line operates on the shanks 1 and 2 independent of the bait-holder, and I am enabled to dispense with springs for operating the pronged shanks.

In practice the parts are caused to assume the position indicated by Fig. 1 and the bait is properly applied to the bait-holder, and when the fish seizes the bait the tension brought upon the fishing-line causes the loop 12 to force the upper extremities of the shanks 1 and 2 in a direction toward each other, so that the barbless prongs are projected through the yoke-shaped bait-holder into the fish. After the fish is landed it can be quickly disengaged from the hook by merely pressing apart the upper extremities of the shanks for the purpose of retracting the barbless prongs to the normal position indicated by Fig. 1, whereby handling the fish and loss of time incident to removing barbed hooks are entirely avoided.

Having thus described my invention, what I claim is—

1. A fish-hook consisting of two crossing shanks 1 and 2, pivoted together at their intersection and provided at one end with loosely-pivoted rings 6 and 7 and at the opposite end with barbless prongs extending at right angles to the shanks and normally lying beside and parallel with each other, a bait-holder suspended from the pivot of the shanks, and a line 10, having a loop 12, loosely passing through the two pivoted rings, substantially as described.

2. A fish-hook consisting of two crossing shanks pivoted together at their intersection and provided at one end with barbless prongs, which in the normal position of the parts lie beside and parallel with each other, and a yoke-shaped bait-holder suspended from the pivot of the shanks and comprising two substantially-parallel arms, between which the barbless prongs project and work back and forth in reverse directions, substantially as described.

3. A fish-hook consisting of two rectilinear crossing shanks pivoted together at their intersection and provided at one end with eyes and at the opposite end with barbless prongs extending at right angles to the shanks and in the normal position of the parts lying beside and parallel with each other, a yoke-shaped bait-holder suspended from the pivot of the shanks and comprising two substantially-parallel arms, between which the barbless prongs project and work back and forth in reverse directions, rings pivotally engaged with the eyes of the shanks, and a line having a loop which loosely passes through the pivoted rings, substantially as described.

In testimony whereof I have hereunto set my hand and affixed my seal in presence of two subscribing witnesses.

LOUIS SHULTS. [L. S.]

Witnesses:
LEVI FREELIC,
OSCAR NORTHEY.